(12) United States Patent
Amadei et al.

(10) Patent No.: US 11,825,988 B2
(45) Date of Patent: Nov. 28, 2023

(54) PROFESSIONAL FRYER

(71) Applicant: Electrolux Professional S.p.A., Pordenone (IT)

(72) Inventors: Simone Amadei, Pordenone (IT); Flavio Caucci, Pordenone (IT)

(73) Assignee: Electrolux Professional S.p.A., Pordenone (IT)

(*) Notice: Subject to any disclaimer, the term of this patent is extended or adjusted under 35 U.S.C. 154(b) by 787 days.

(21) Appl. No.: 16/766,147

(22) PCT Filed: Nov. 16, 2018

(86) PCT No.: PCT/EP2018/081539
§ 371 (c)(1),
(2) Date: May 21, 2020

(87) PCT Pub. No.: WO2019/105763
PCT Pub. Date: Jun. 6, 2019

(65) Prior Publication Data
US 2020/0359838 A1    Nov. 19, 2020

(30) Foreign Application Priority Data
Dec. 1, 2017 (EP) .................................... 17204857

(51) Int. Cl.
*A47J 37/12* (2006.01)

(52) U.S. Cl.
CPC ......... *A47J 37/129* (2013.01); *A47J 37/1261* (2013.01); *A47J 37/1266* (2013.01);
(Continued)

(58) Field of Classification Search
CPC ................ A47J 37/1209; A47J 37/1242; A47J 37/1257; A47J 37/1261; A47J 37/1276; A47J 37/129
See application file for complete search history.

(56) References Cited

U.S. PATENT DOCUMENTS

| 3,363,541 A | 1/1968 | Anetsberger |
| 4,289,477 A * | 9/1981 | Moore ....................... A23L 5/11 |
| | | 126/369 |
| 5,809,995 A | 9/1998 | Kobayashi |

FOREIGN PATENT DOCUMENTS

| CH | 629948 | 5/1982 |
| CN | 2805630 | 8/2006 |

(Continued)

OTHER PUBLICATIONS

Office action in counterpart Chinese application No. 201880077518.1 dated Feb. 21, 2022, 12 pages (English Translation).
(Continued)

*Primary Examiner* — Reginald Alexander
(74) *Attorney, Agent, or Firm* — Pearne & Gordon LLP

(57) ABSTRACT

A deep fat fryer (1) comprising: a housing (2), a pot (3) adapted to contain a cooking medium, one or more heating elements (4a, 4b), external to said pot (3), for heating a cooking medium contained in said pot (3), a temperature sensor (5) adapted to measure the temperature of a cooking medium contained in said pot (3), a control unit (9), controlling the electrical components of the deep fat fryer (1). The deep fat fryer (1) comprises one or more heat-shield elements (6a, 6b) arranged for slowing down the heat transfer from said one or more heating elements (4a, 4b) to a cooking medium contained in said pot (3).

13 Claims, 6 Drawing Sheets

(52) U.S. Cl.
CPC ....... *A47J 37/1271* (2013.01); *A47J 37/1276* (2013.01); *A47J 2202/00* (2013.01)

(56) References Cited

FOREIGN PATENT DOCUMENTS

| | | | |
|---|---|---|---|
| DE | 4342727 C1 | * | 4/1995 |
| DE | 29713120 | | 9/1997 |
| DE | 10349253 A1 | * | 5/2005 |
| EP | 0550364 | | 7/1993 |
| EP | 0931492 A2 | * | 7/1999 |
| JP | 2015070861 | | 4/2005 |
| JP | 2016077425 | | 5/2016 |
| KR | 20030010295 | | 2/2003 |
| NL | 9191807 A | * | 10/1991 |
| WO | 2012141374 | | 10/2012 |

OTHER PUBLICATIONS

Written Opinion and International Search Report for PCT/US2018/081539, dated Dec. 10, 2018, 6 pages.

* cited by examiner

PROFESSIONAL FRYER

FIELD OF THE INVENTION

The present invention relates to a deep fat fryer, particularly suited for deep-frying foods in professional kitchens, for example in the kitchens of restaurants, hotels, fast-foods, kiosks or canteens.

BACKGROUND ART

Modern deep fat fryers are commonly used in professional kitchens for performing deep-frying of food, i.e. a cooking method wherein food is submerged in relatively large quantities of edible cooking oil at high temperature.

The fryers of this kind comprise a frying pot, which typically is a box-shaped body open on the top, adapted to contain a liquid medium (e.g. oil). The box-shaped body preferably has a Y-shaped or T-shaped cross section, so that the lower portion of the pot is narrower than the upper portion.

The fryers of this kind also comprise one or more heating elements external to the pot and facing its lower portion. A temperature sensor, which is typically installed in the upper portion of the pot, is operatively connected to a control unit for controlling the heating elements depending on the cooking medium temperature.

A known type of such kind of professional fryers is disclosed in AU2008201888. The shape of the pot allows a rapid increase of the cooking medium temperature, because the bottom portion of the pot contains a relative small volume of cooking medium compared to the surface of such a bottom portion exposed to the heating elements.

Anyway this solution has a drawback: since heat is meanly distributed within the pot by the cooking medium convective movements, if the level of the cooking medium is low, heat tends to accumulate only in the lower portion of the pot and to rapidly increase the temperature in this zone; in this condition, the temperature sensor, located in the upper portion of the pot, is unable to sense rapidly the temperature increment and to turn off the heating elements before cooking medium overheating.

SUMMARY OF THE INVENTION

The aim of the present invention is providing a fryer which overcomes the aforementioned drawback, and is therefore reliable also with a low level of cooking medium. Within this aim, another object of the invention is to obtain such a reliable fryer without a substantial increase of the costs compared to the known solutions. Applicant has found that by providing one or more heat-shield elements slowing down the heat transfer from the heating elements to a cooking medium contained in the pot, it is possible to reduce the temperature increase per unit of time of the cooking medium, so as to allow a reliable temperature measurement before the cooking medium overheating, also in case of low level of cooking medium.

The aim is in particular fulfilled by a deep fat fryer comprising:
 a housing,
 a pot, adapted to contain a cooking medium,
 one or more heating elements, external to the pot, for heating a cooking medium contained in the pot,
 a temperature sensor, mounted inside the pot and adapted to measure the temperature of a cooking medium contained in the pot,
 a control unit, controlling the electrical components of the deep fat fryer,
 wherein the deep fat fryer comprises one or more heat-shield elements arranged for slowing down the heat transfer from the one or more heating elements to a cooking medium contained in the pot.

The presence of the heat-shield elements causes a slower temperature increment of the cooking medium inside the pot, so that the temperature sensor has more time to sense the temperature increase and, when the temperature reaches a prefixed threshold, such sensor can send a signal to the control unit which turns off the heating elements, preventing cooking medium overheating.

The control unit can be for example a microprocessor, an electronic board, etc. Preferably, the one or more heat-shield elements are interposed between the one or more heating elements and the internal volume of the pot adapted to contain a cooking medium.

More preferably, the one or more heat-shield elements are interposed between the one or more heating elements and the pot.

In an advantageous embodiment, the pot comprises a box-shaped body, open on the top, and at least one of the one or more heating elements is arranged in such a way to at least partially face the external surface of the box-shaped body. The one or more heating elements do not reduce the internal volume of the box-shaped body available for the cooking medium.

The box-shaped body is suitable for containing the cooking medium, and preferably also one or more baskets, removably positioned inside the pot and adapted for collecting the food to be fried.

Preferably, at least one of the one or more heat-shield elements is mounted on the box-shaped body.

More preferably, at least one of the one or more heat-shield elements is mounted on the external surface of the box-shaped body, in such a way to at least partially face at least one of the one or more heating elements. In this case it is easier to assembly and disassembly such heat-shield elements to the pot, and the internal volume of the pot available for the cooking medium is not reduced.

In a further advantageous embodiment, at least one of the one or more heat-shield elements is mounted on the internal surface of said box-shaped body. This embodiment allows a safer assembly procedure, since it avoids possible bumps of the heat-shield elements against the heating elements during the mounting of the latter.

In another advantageous embodiment, at least one of the one or more heat-shield elements is mounted externally and spaced apart from the box-shaped body, in such a way to at least partially face at least one of said one or more heating elements.

Preferably, the pot, more preferably the box-shaped body, comprises an upper portion and a bottom portion, wherein the volume enclosed by the bottom portion is lower than the volume enclosed by the upper portion. The cooking medium contained in the lower portion, due to the lower volume of the latter, increases its temperature faster than the cooking medium contained in the upper portion, causing high convective movements of the cooking medium from the bottom to the upper portion, which help to mix the cooking medium and to make it more uniform.

In a preferred embodiment, the box-shaped body comprises a front wall, a rear wall, two lateral walls and a bottom wall.

More preferably, the distance between the lateral walls in the bottom portion is lower than the distance between the lateral walls in the upper portion, so as to define an Y-shaped, or T-shaped, cross section.

In an advantageous embodiment, at least one of the one or more heating elements faces one of the two lateral walls of the pot, and at least one of the heat-shield elements is mounted on the external surface of such lateral wall and at least partially faces this heating element.

In an advantageous embodiment, at least one of the one or more heating elements faces one of the two lateral walls of the pot, and at least one of the heat-shield elements is mounted on the internal surface of such lateral wall.

In another advantageous embodiment, at least one of the one or more heating elements faces one of the two lateral walls of the pot, and at least one of the heat-shield elements is mounted externally and spaced apart from this lateral wall, between the latter and the heating element facing it.

In an advantageous embodiment, one or more heating elements faces the bottom portion of the pot. This is particularly advantageous when the pot has a bottom portion enclosing a volume lower than the upper portion, since the consequent higher heating of the bottom portion helps the convective movements of the cooking medium explained above.

In an advantageous embodiment, at least one of the one or more heating elements faces the bottom wall of the box-shaped body, and at least one of the heat-shield elements is mounted on the external surface of the bottom wall of the pot and at least partially faces this heating element.

In an advantageous embodiment, at least one of the one or more heating elements faces the bottom wall of the box-shaped body, and at least one of the heat-shield elements is mounted on the internal surface of the bottom wall of the pot.

In another advantageous embodiment, at least one of the one or more heating elements faces the bottom wall of the box-shaped body, and at least one of the heat-shield elements is mounted externally and spaced apart from this bottom wall, between the latter and the heating element facing it.

Preferably, one or more heating elements extend from the front wall to the rear wall of the pot.

In an advantageous embodiment, a user interface is associated to the housing and is functionally connected to the control unit. The user interface can be for example a knob, a touch screen or another input/output device.

Preferably, the heating elements comprise a frame, one or more electric heaters operatively connected to the control unit, and one or more electrical connectors for connecting the heating elements to a power supply.

The deep fat fryer comprises a temperature sensor, preferably positioned in the upper portion of the pot, more preferably in a lower region of the upper portion. This position of the temperature sensor allows a good measure of the cooking medium temperature, because the cooking medium tends to rise from the bottom portion to the upper portion due to the convective movements explained above.

The temperature sensor is advantageously operatively connected to the control unit in such a way that the control unit turns off the heating elements when a predetermined temperature of the cooking medium is sensed by said temperature sensor. Turning off the heating elements at a predetermined temperature prevents the cooking medium overheating.

Preferably, at least one of the heat-shield elements comprises a plate or sheet.

More preferably, such plate or sheet is placed on the external or on the internal surface of the bottom portion of the pot.

In a further advantageous embodiment, at least one of the heat-shield elements comprises a plurality of components, placed side by side and spaced one another. The spacing between the components of the heat-shield elements reduces the risk that, during the heating, the single components, due to their thermal deformation, push ones against the others with the risk of breaks, permanent displacements or deformations.

The spacing between a pair of components of a heat-shield element can be an air gap, or it can be filled by a suitable deformable material, e.g. a plastic material.

More preferably, at least one of the one or more heat-shield elements comprises two plates or sheets placed side by side and spaced one another.

Preferably, at least one of the one or more heat-shield elements is fixed to the box-shaped body by screws and nuts, or by welding.

Preferably, at least one of the one or more heat-shield elements is made of metal, more preferably it is made of steel, even more preferably by AISI 430A steel. AISI 430A grants an effective heat shielding of the cooking medium contained in the pot, and it has also a good corrosion resistance and low thermal deformation.

In an advantageous embodiment, at least one of the one or more heat-shield elements comprises a plate or sheet having a thickness between 1 and 7 mm. This thickness guarantees a good thermal shielding effect without highly increasing the heating time of the cooking medium in the normal frying conditions, i.e. a frying with the cooking medium level suggested by the deep fat fryer producer.

LIST OF FIGURES

DETAILED DESCRIPTION

Figure 1:
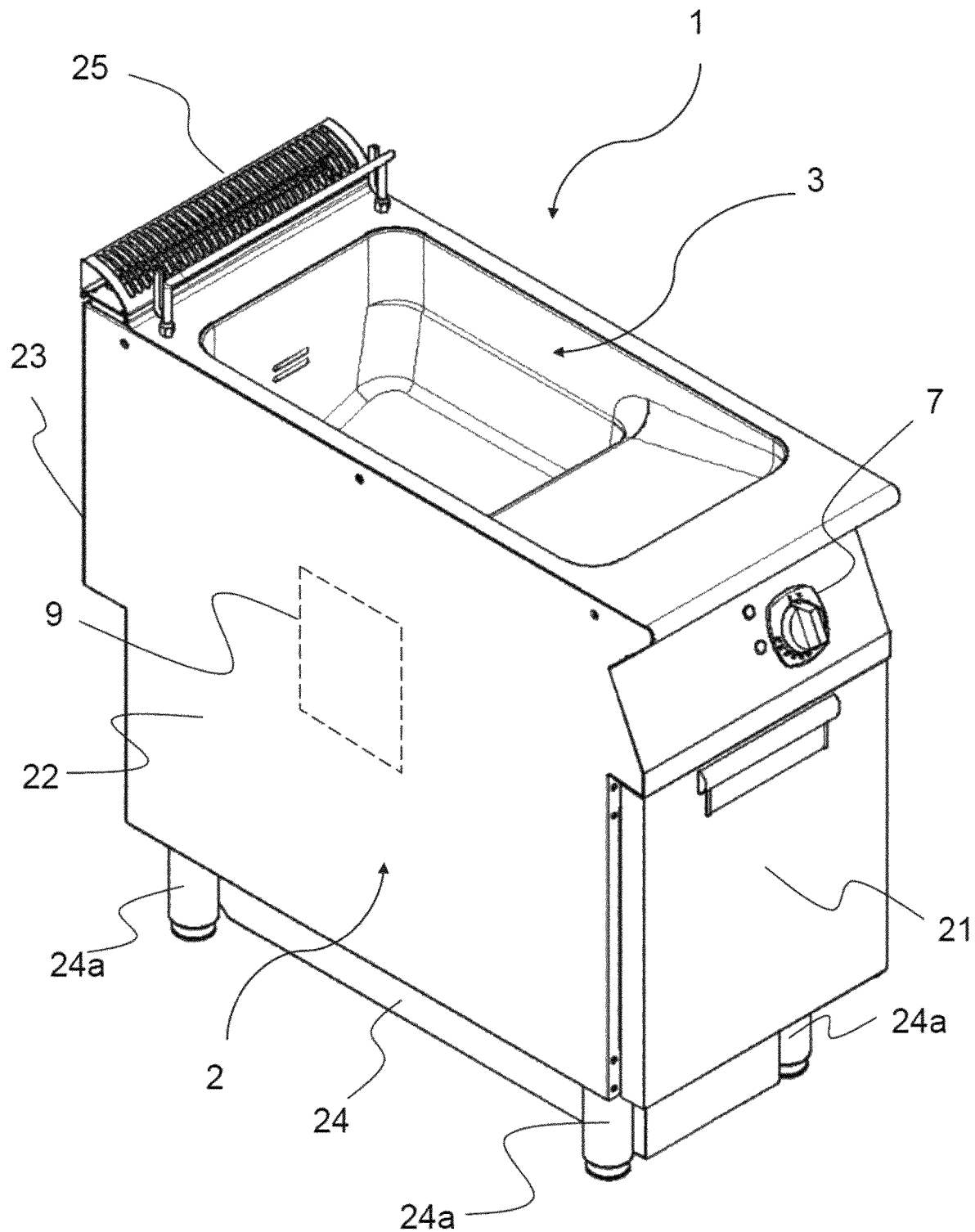
FIG. 1 shows a perspective view of a fryer according to a particular embodiment of the present invention.
Figure 2:
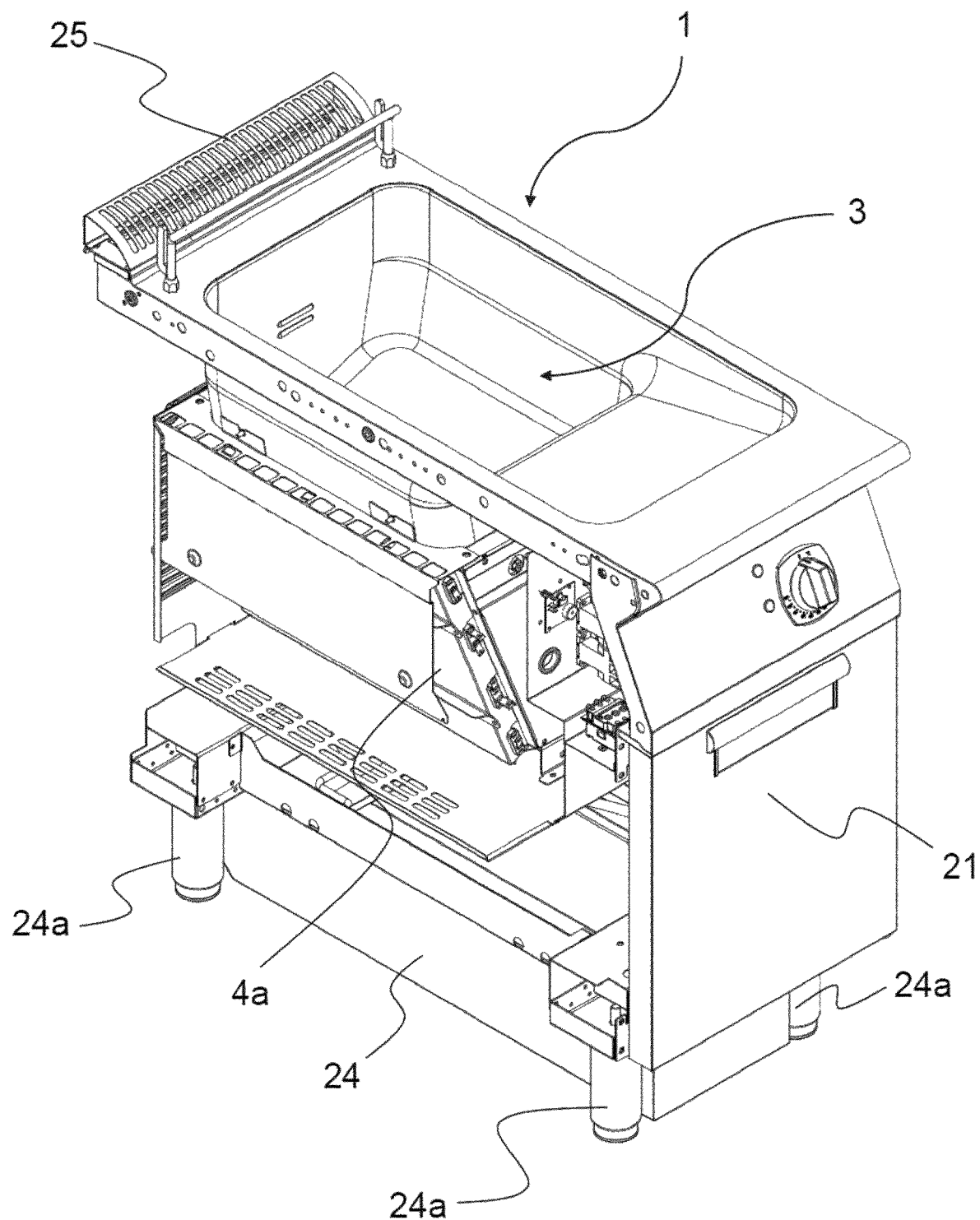
FIG. 2 shows the fryer of FIG. 1 with a side panel removed.

In FIG. 1 a deep fat fryer (called also simply fryer) according to an advantageous embodiment of the present invention is referred to with the reference number 1; the deep fat fryer 1 is provided with a housing 2, which advantageously comprises suitable front panel 21, side panels 22 and back panel 23, and a support 24 for supporting the panels. In this advantageous embodiment, the support 24 comprises four feet 24a, adapted to rest on a floor.

FIG. 1 illustrates the fryer 1 in an operative condition in which it rests on a floor on the feet 24a.

The fryer 1 comprises a pot 3 (which can also be called tank, tub or vat) arranged within the housing 2 and suitable for containing oil, liquid lard, other liquid fats or further cooking media. The fryer 1 also comprises one or more baskets, not shown, usually made of metal grid, which can be removably positioned inside the pot 2, and adapted for collecting the food to be fried.

The fryer 1 further comprises a control unit 9, schematically shown in FIG. 1, adapted to control the electrical components of the fryer 1.

In the advantageous embodiment shown in FIG. 1 a user interface 7 is illustrated. The user interface 7 is preferably arranged on the front panel 21 of the housing 2. The user interface 7 is functionally connected to the control unit 9, allowing the user to operate the fryer 1. The user interface 7 can be for example a knob (as in FIG. 1), a touch screen or another input/output device.

Preferably, the fryer 1 comprises a grid 25 protecting an exhaust port, not illustrated, by which heated gas/air is drained from the internal of the housing 2.

The grid 25 also prevents the accidental fall of external objects into the exhaust port; furthermore, the grid 25 prevents that the exhaust port is obstructed if the user places an object on the grid 25.

With reference to FIGS. 2 to 6, the fryer 1 without a side panel 22. The fryer 1 further comprises one or more suitable heating elements 4a, 4b for heating the cooking medium, for example electric heaters (as illustrated), gas burners or infra-red heaters. The heating elements 4a, 4b will be better described in the following. FIG. 3, FIG. 4, FIG. 5 and FIG. 6 show the fryer 1 without the housing panels 21, 22 and 23, for better illustrating the pot 3. The pot 3 advantageously comprises a box-shaped body 30, open on the top, which comprises a front wall 31, a rear wall 32, two lateral walls 33a and 33b and a bottom wall 34.

Figure 5:
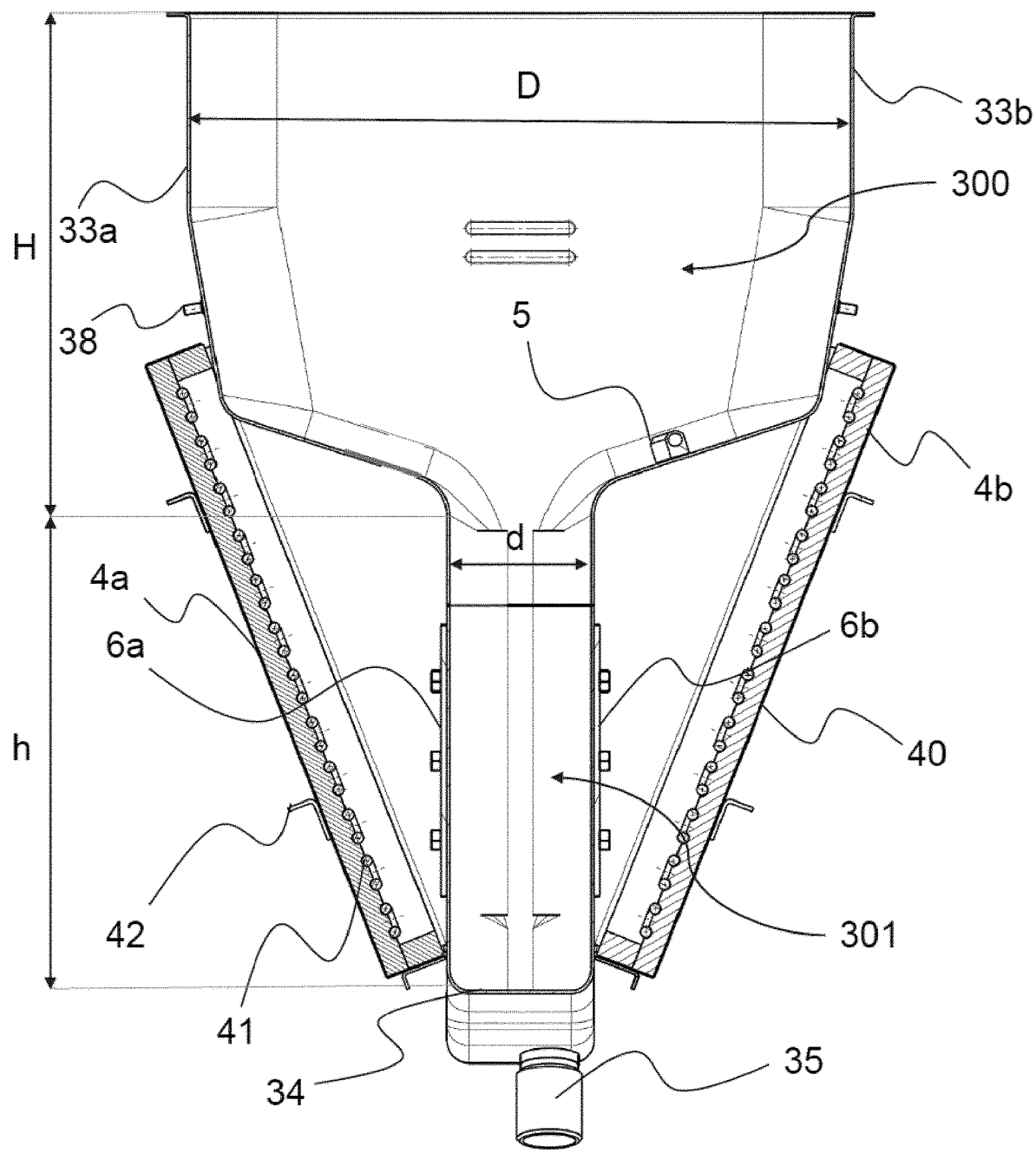
FIG. 5 is a cross section operated according to plane V of FIG. 4.
Figure 6:
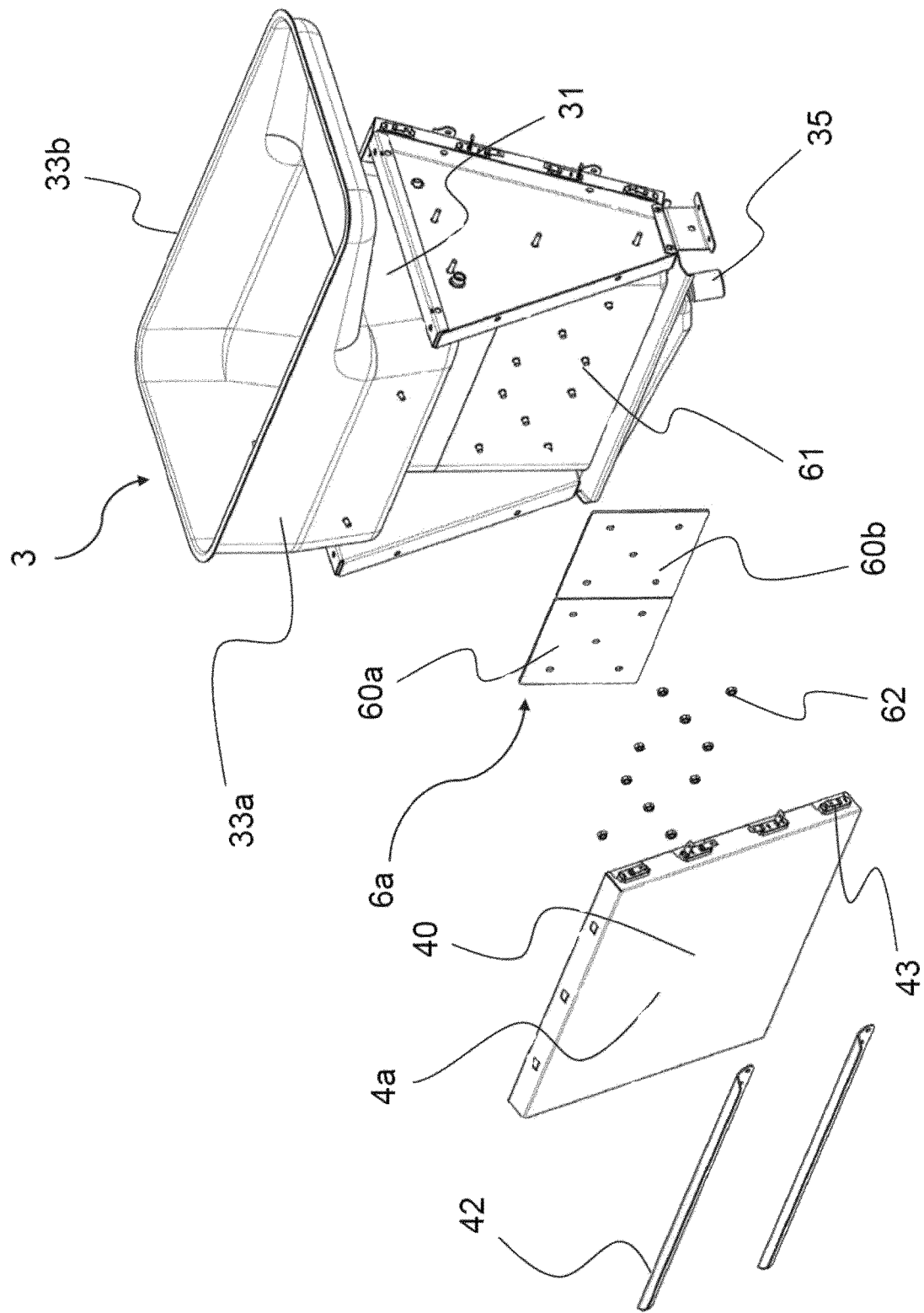
FIG. 6 is an exploded view of FIG. 4.

Preferably, as shown in FIG. 5, the pot 3, in particular the box-shaped body 30, comprises an upper portion 300 and a bottom portion 301; preferably the volume enclosed by the bottom portion 301 is lower than the volume enclosed by the upper portion 300.

Preferably, the distance "d" between the lateral walls 33a and 33b in the bottom portion 301 is lower than the distance "D" between the lateral walls 33a and 33b in the upper portion 300, so as to define an Y-shaped, or T-shaped, cross section.

Preferably, the height "H" of the upper portion 300 and the height "h" of the bottom portion 301 are dimensioned in such a way that the volume enclosed by the bottom portion 301 is lower than the volume enclosed by the upper portion 300.

Preferably, the bottom portion 301 is provided with a drain 35, for draining the cooking medium.

Figure 3:
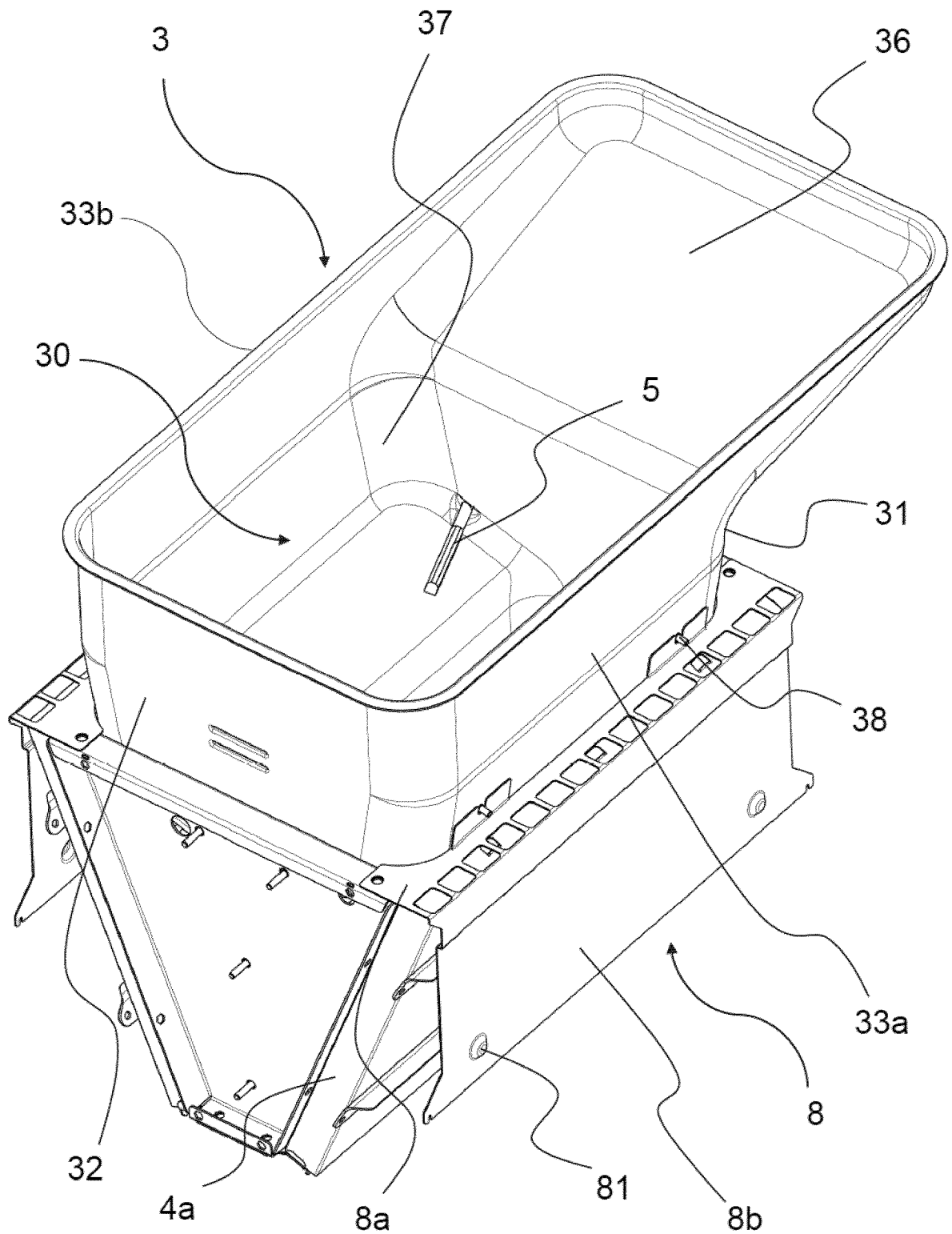
FIG. 3 shows the fryer of FIG. 1 without the housing panels.
Figure 4:
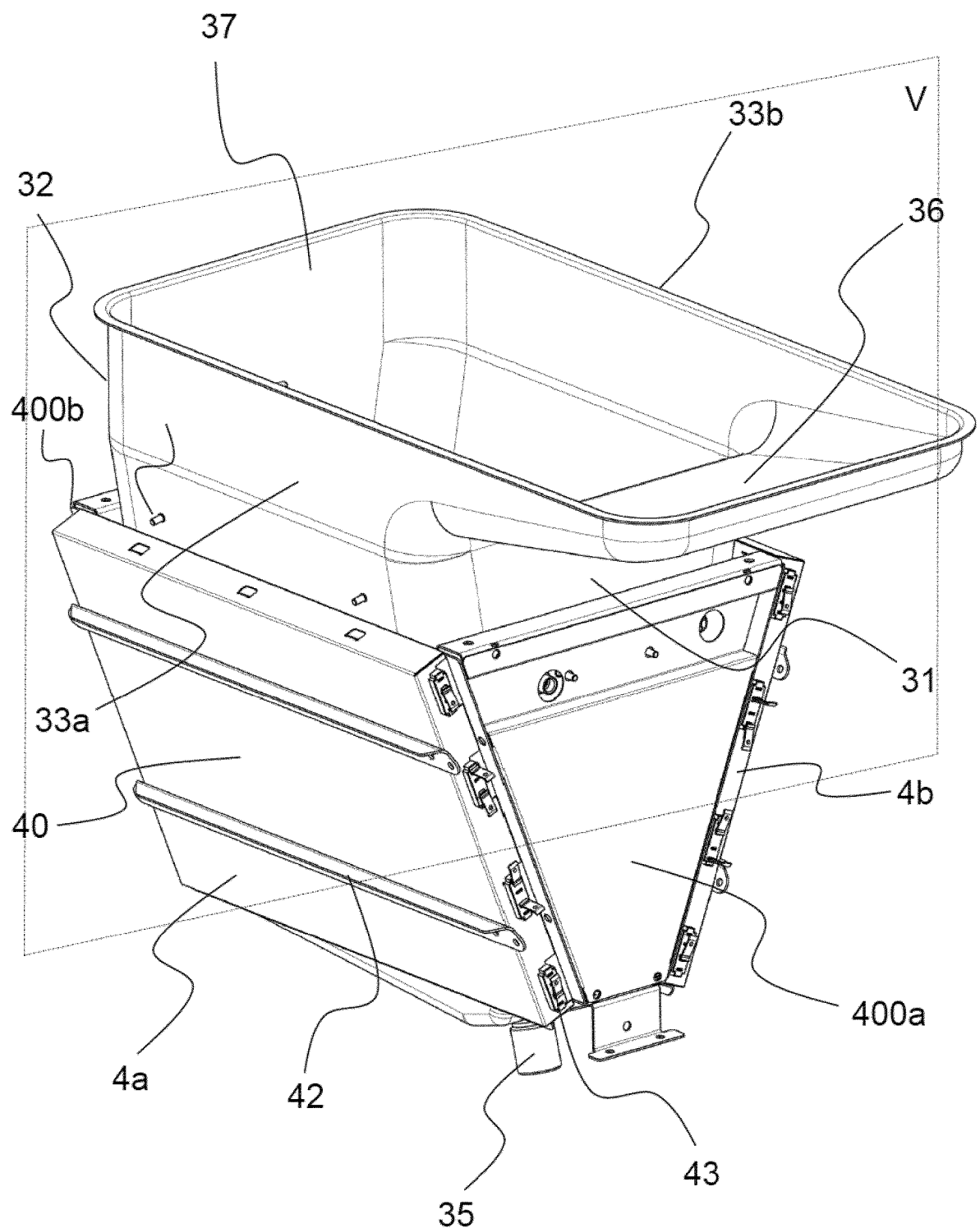
FIG. 4 is another perspective view of the fryer of FIG. 1 with some parts removed.

Preferably, as shown in FIG. 3 and in FIG. 4, the upper portion 300 comprises a main volume 37, adapted to receive a frying basket, not illustrated, and a protruding portion 36. The protruding portion 36 is adapted to contain the cooking medium quantity which tends to exit the main volume 37 when the latter receives the basket. In FIG. 4 a plane V is also indicated, which is vertically oriented (with respect to the operative condition illustrated in FIG. 1) and crosses the main volume 37 of the upper portion 300 of the pot.

As mentioned before, the deep fat fryer 1 also comprises one or more heating elements 4a and 4b, arranged in such a way to at least partially face the external surface of the box-shaped body 30. Preferably, the heating elements 4a, 4b are arranged in such a way to at least partially face, respectively, one of the lateral walls 33a, 33b of the bottom portion 301 of the pot 3 and to transmit heat, mainly by radiation, to such respective lateral walls 33a and 33b. The heating elements 4a and 4b extend preferably from the front wall 31 to the rear wall 32 of the pot 3, so as to heat the bottom portion 301 of the pot in all its length. In the preferred embodiment described in the figures, the heating elements 4a, 4b are positioned to face the majority (e.g. 90% of the surface) of the respective lateral walls of the bottom portion 301 of the pot 3, and more preferably also partially (e.g. 30% of the surface) the upper portion 300 of the pot 3.

In an advantageous embodiment not illustrated, at least one heating element 4a, 4b faces the bottom wall 34 of the box-shaped body 30.

As shown in FIG. 4, the heating elements 4a and 4b preferably comprise a frame 40, enclosing one or more electric heaters 41 operatively connected to the control unit 9.

The heating elements 4a and 4b are advantageously fixed to two support elements 400a and 400b, preferably trapezoid shaped, respectively attached to the front wall 31 and back wall 32 of the pot 3. Preferably the frame 40 comprises one or more connecting elements 42, which can be fixed to the support elements 400a and 400b (for example with screws, not illustrated). Preferably the frame 40 comprises one or more electrical connectors 43 for connecting the heating elements 4a and 4b to a power supply.

Preferably, the frying pot 3 further comprises a temperature sensor 5 (see FIG. 3 and FIG. 5), arranged to measure the temperature inside the pot 3. Preferably, the temperature sensor 5 is positioned in the upper portion 300 of the pot, more preferably in a lower region of the upper portion 300. During the normal operation of the fryer (for example both upper portion 300 and bottom portion 301 filled with cooking medium), this position of the temperature sensor 5 allows a good measure of the cooking medium temperature, because the cooking medium tends to rise from the bottom portion 301 to the upper portion 300 due to the convective movements. The temperature sensor 5 is operatively connected to the control unit 9 in such a way that the control unit 9 turns off the heating elements 4a, 4b when a predetermined temperature of the cooking medium is sensed by said temperature sensor 5, so as to prevent cooking medium overheating.

Preferably, the fryer 1 also comprises brackets 8 (see FIG. 3) The brackets 8 are preferably L shaped and have a first branch 8a, preferably substantially horizontal, connected to a lateral wall 33a or 33b of the pot 3 and to the support elements 400a and 400b, and a second branch 8b, preferably substantially vertical, positioned between one of the heaters 4a or 4b and one of the lateral walls 22 of the housing 2, to reduce the heat transfer therebetween.

Preferably the second branches 8b of the brackets 8 are spaced from the respective lateral wall 22 of the housing 2 they face, so as to define an interspace therebetween, which thermally insulates the lateral wall 22 from the respective bracket 8; on this purpose, preferably, the brackets 8 comprise one or more spacers 81 (for example bulges) which maintain a certain distance between a bracket 8 and respective lateral wall 22.

Preferably, the pot 3 also comprise one or more connecting pins 38 (see FIG. 3 and FIG. 5), adapted to connect the brackets 8 to a lateral wall 33a or 33b of the pot 3. The fryer 1 comprises one or more heat-shield elements 6a and 6b (see FIG. 5 and FIG. 6). Preferably, at least one heat-shield element 6a, 6b is mounted on the box-shaped body 30. More preferably, at least one heat-shield element 6a, 6b is mounted on the external surface of the box-shaped body 30, in such a way to at least partially face at least one heating element 4a, 4b. In the embodiment illustrated, the heat-shield elements 6a, 6b are mounted on a respective lateral wall 33a, 33b of the pot 3 and arranged for slowing down the heat transfer from the heating elements 4a and 4b to a cooking medium contained in the pot 3. Consequently, the cooking medium temperature increase per unit of time is reduced, and the temperature sensor 5 has more time to sense the temperature increase of the cooking medium. This is particularly useful with a low level of cooking medium inside the pot, since in this condition, without the heat-shield elements 6a and 6b, the temperature in the bottom portion 301 tends to rise very rapidly, and the cooking medium can overheat. The presence of the heat-shield elements 6a and 6b causes a slower temperature increment of the cooking medium inside the pot 3, and therefore the temperature sensor 5 has more time to sense the temperature increase of the cooking medium and, when the temperature reaches a threshold, such sensor 5 can send a signal to the control unit 9, in such a way that the control unit 9 turns off the heating elements so as to prevent cooking medium overheating.

In a further embodiment, not illustrated, at least one heat-shield element 6a, 6b is mounted on the internal surface of said box-shaped body 30.

In another embodiment, not illustrated, at least one heat-shield element 6a, 6b is mounted externally and spaced apart from the box-shaped body 30, in such a way to at least partially face at least one heating element 4a, 4b.

Preferably, each heat-shield element 6a and 6b covers the majority (i.e. 90%) of the respective lateral wall 33a or 33b of the bottom portion 301 of the pot 3. In a not illustrated embodiment, each heat-shield element 6a and 6b can also partially cover (i.e. 30%) the respective lateral wall 33a or 33b of the upper portion 300 of the pot 3.

Preferably, at least one heat-shield element 6a, 6b comprises a plurality of components 60a, 60b (see FIG. 6), placed side by side and spaced one another. The spacing between the components of the heat-shield elements reduces the risk that, during the heating, the single components, due to their thermal deformation, push ones against the others with the risk of breaks, permanent displacements or deformations.

The spacing between a pair of heat-shield elements can be an air gap, like in the embodiment illustrated in the figures, or it can be filled by a suitable deformable material, e.g. a plastic material.

In the preferred embodiment illustrated in the drawings, each heat-shield element 6a, 6b comprises two plates 60a, 60b, placed side by side on the external surface of the bottom portion 301 and spaced one another by a small air gap. Preferably, the heat-shield elements 6a and 6b are fixed to the external surface of the respective lateral wall 33a, 33b by screws 61 and nuts 62, or by welding.

In another advantageous embodiment, not illustrated, one or more heat-shield elements can comprise two plates, placed side by side on the internal surface of the bottom portion 301 and spaced one another by a small air gap.

In an advantageous embodiment, also not illustrated, one or more heat-shield elements can be fixed to the internal surface of the respective lateral wall 33a, 33b by screws 61 and nuts 62, or by welding.

In a further advantageous embodiment, not illustrated, one or more heat-shield elements can comprise a single plate, placed on the external or on the internal surface of the bottom portion 301.

Preferably, the heat-shield elements 6a, 6b are made of metal, more preferably of steel, for example AISI 430.

The heat-shield elements 6a, 6b thickness is preferably comprised between 1 and 7 mm; this thickness guarantees a good thermal shielding effect without highly increasing the heating time of the cooking medium in the normal frying conditions (for example with a normal filling of the pot 3).

An example of the operation and use of the fryer 1 will now be described. The user fills the pot with edible cooking medium, selects a desired cooking program, interacting with the user interface 7, connected with the control unit 9. The control unit 9 turns on the heaters 4a and 4b in order to increase the cooking medium temperature inside the pot 3. The temperature sensor 5 is operatively connected to the control unit 9 in such a way that the control unit 9 turns off the heating elements 4a, 4b when a predetermined temperature of the cooking medium is sensed by said temperature sensor 5. After the desired temperature has been reached, the user places the frying basket, filled with a batch of food to be fried, in the cooking medium contained in the pot. When the food to be fried reaches a desired frying condition, the user can remove the food from the pot by pulling up the basket.

If the user accidentally fills the pot 3 with a too small quantity of cooking medium, the heat-shield elements 6a and 6b slow down the heat transfer from the heating elements 4a and 4b to the cooking medium (the heat transfer would be otherwise extremely rapid due to the low quantity of cooking medium inside the pot), reducing the cooking medium temperature increase per unit of time, and allowing the temperature sensor 5 to perform a reliable cooking medium temperature measurement before cooking medium overheating. The temperature sensor 5, thanks to the slower temperature increment of the cooking medium, has more time to sense the temperature increase of the cooking medium. The temperature sensor 5 is operatively connected to the control unit 9 in such a way that the control unit 9 turns off the heating elements 4a, 4b when a predetermined temperature of the cooking medium is sensed by said temperature sensor 5, so as to prevent cooking medium overheating.

From the above description it is clear how the invention solves the previous mentioned aim and objects, since thanks to the heat-shield elements it is possible to reduce the temperature increase per unit of time of the cooking medium and to allow a reliable temperature measurement before the cooking medium overheating also in case of low level of the cooking medium.

The invention claimed is:

1. A deep fat fryer comprising:
   a housing,
   a pot adapted to contain a cooking medium,
   one or more heating elements, external to said pot, for heating a cooking medium contained in said pot,
   a temperature sensor adapted to measure a temperature of a cooking medium contained in said pot,
   a control unit adapted to control electrical components of the deep fat fryer, and
   one or more heat-shield elements arranged for slowing down heat transfer from said one or more heating elements to a cooking medium contained in said pot, said one or more heat-shield elements being mounted to and flush against an external surface of the pot.

2. The deep fat fryer according to claim 1, wherein said pot comprises a box-shaped body open on top, and wherein said one or more heating elements are arranged in such a way to at least partially face an external surface of said box-shaped body.

3. The deep fat fryer according to claim 2, wherein at least one of said one or more heat-shield elements is mounted on said box-shaped body.

4. The deep fat fryer according to claim 2, wherein at least one of said one or more heat-shield elements is mounted on the external surface of said box-shaped body, in such a way to at least partially face at least one of said one or more heating elements.

5. The deep fat fryer according to claim 2, wherein said box-shaped body comprises a front wall, a rear wall, two lateral walls, and a bottom wall, wherein at least one of said one or more heating elements faces one of said two lateral walls, and wherein at least one of said one or more heat-shield elements is mounted on said lateral wall faced by at least one of said one or more heat-shield elements.

6. The deep fat fryer according to claim 2, wherein at least one of said one or more heat-shield elements is fixed to said box-shaped body by screws and nuts, or by welding.

7. The deep fat fryer according to claim 1, wherein said pot comprises a bottom portion and an upper portion, and wherein said one or more heat-shield elements are fixed to said bottom portion.

8. The deep fat fryer according to claim 1, wherein at least one of said one or more heat-shield elements comprises a plate or sheet.

9. The deep fat fryer according to claim 1, wherein at least one of said one or more heat-shield elements is made of metal.

10. The deep fat fryer according to claim 9, wherein at least one of said one or more heat-shield elements is made of steel.

11. The deep fat fryer according to claim 1, wherein at least one of said one or more heat-shield elements comprises a plate or sheet having a thickness between 1 and 7 mm.

12. A deep fat fryer comprising:
a housing,
a pot adapted to contain a cooking medium,
one or more heating elements, external to said pot, for heating a cooking medium contained in said pot,
a temperature sensor adapted to measure a temperature of a cooking medium contained in said pot,
a control unit adapted to control electrical components of the deep fat fryer, and
one or more heat-shield elements arranged for slowing down heat transfer from said one or more heating elements to a cooking medium contained in said pot, wherein at least one of said one or more heat-shield elements comprises a plurality of components, placed side by side and spaced from one another.

13. The deep fat fryer according to claim 12, wherein said at least one of said one or more heat-shield elements comprises two plates or sheets placed side by side and spaced from one another.

* * * * *